July 14, 1925. 1,545,652
J. HAGERTY
APPARATUS FOR TESTING EYES
Filed Sept. 16, 1924 2 Sheets-Sheet 2
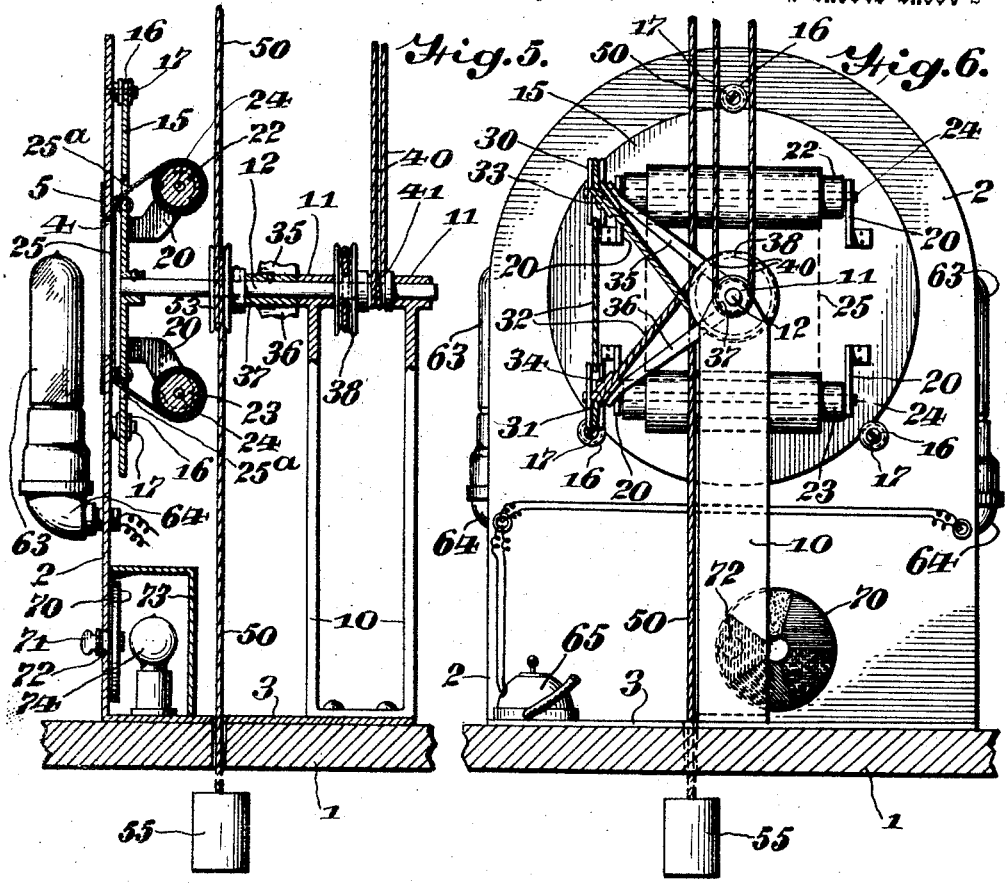
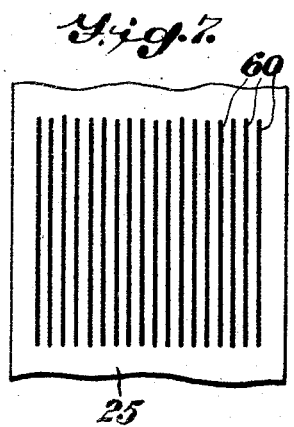
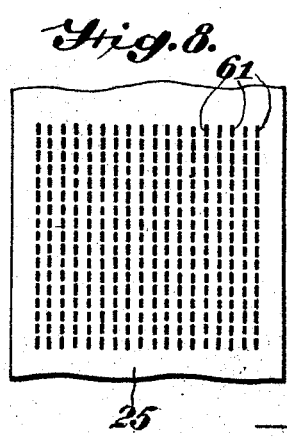
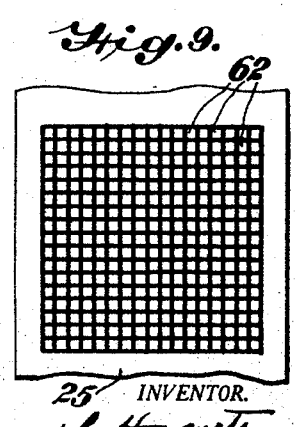
INVENTOR.
Joseph Hagerty
BY
Cyrus N. Anderson
ATTORNEY.

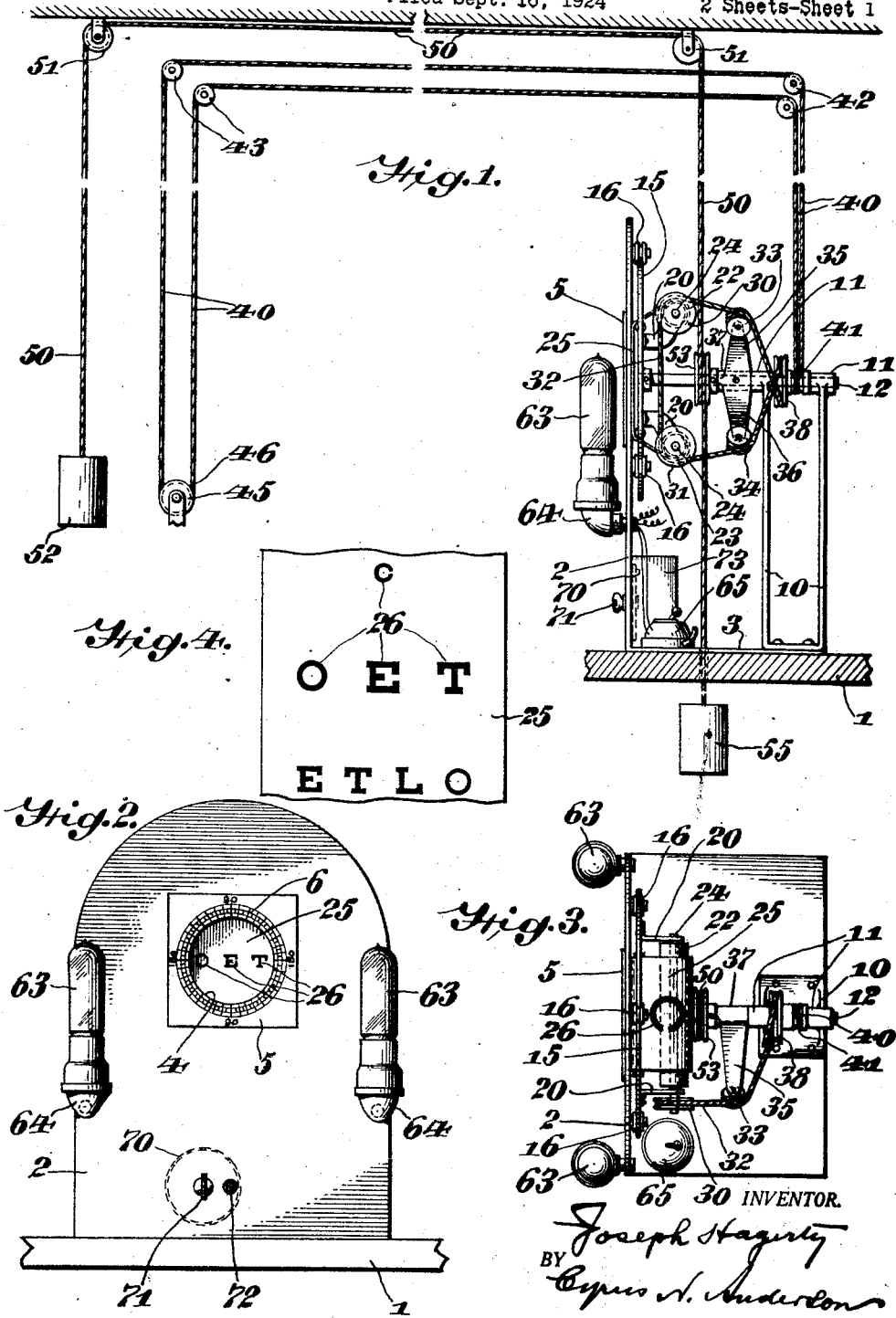

Patented July 14, 1925.

UNITED STATES PATENT OFFICE.

JOSEPH HAGERTY, OF PHILADELPHIA, PENNSYLVANIA.

APPARATUS FOR TESTING EYES.

Application filed September 16, 1924. Serial No. 737,997.

*To all whom it may concern:*

Be it known that I, JOSEPH HAGERTY, a citizen of the United States, and a resident of Philadelphia, in the county of Philadelphia and State of Pennsylvania, have invented an Improvement in Apparatus for Testing Eyes, of which the following is a specification.

My invention relates to apparatus for testing the eyes and it has for its general object to provide an improved and novel construction of means for supporting the test objects by the use of which the condition of the eyes of a person may be examined and tested for the purpose of ascertaining the acuity of vision and for other purposes such as ascertaining the condition of the eyes as to astigmatism.

It is also an object of the invention to provide means of novel construction by the employment of which the character and construction of lens to be employed for the correction of an astigmatic condition of the eyes may be indicated.

A further object of the invention is to provide a novel construction of means for supporting and adjusting the test objects which are employed in and as a part of the apparatus.

Other objects and advantages of the invention will be pointed out in the detailed description thereof which follows or will be apparent from such description.

In order that the invention may be readily understood and its practical advantages fully appreciated, reference should be had to the accompanying drawings in which 1 have illustrated one convenient form of mechanical embodiment thereof. However, it will be understood that the invention is susceptible of embodiment in other forms of construction than that shown and that changes in the details of construction may be made within the scope of the claims without departing from the principle of the said invention.

In the drawings:

Fig. 1 is a view in side elevation of an eye testing apparatus embodying the invention;

Fig. 2 is a view in front elevation thereof;

Fig. 3 is a top plan view;

Fig. 4 is a view in front elevation of a portion of a sheet of material upon which appears a number of test objects;

Fig. 5 is a central vertical sectional view taken in a plane extending from front to rear of the apparatus;

Fig. 6 is a view in rear elevation of the said apparatus; and

Figs. 7, 8 and 9 are plan or face views of portions of sheets bearing thereon modified forms and arrangements of test objects.

Referring to the drawings: 1 designates a base upon which an upright panel 2 is supported. The said panel is provided at its lower end with a rearwardly extending flange 3 which is secured to the supporting base 1.

The panel 2 is provided with an opening 4 about which is fastened an annular plate 5 which is secured to the front side of the panel 1 and upon which a degree scale 6 is formed.

A supporting standard of U shape comprising legs 10 is mounted upon the rear portion of the rearwardly extending flange 3 and upon the base 1, previously referred to. The legs 10 are provided with bearings 11 at their upper ends within which is rotatably mounted a shaft 12. Mounted upon the forward end of said shaft is a circular plate or disc 15 the periphery of which is supported in grooved wheels 16 mounted upon short studs 17 which project rearwardly from the upright panel 2. The plate 15 is located in close proximity to the rear side of the panel 2. Bracket arms 20 are mounted upon the rear side of the circular plate 15 and project rearwardly therefrom. These brackets are located in the same relation to each other as the four corners of a square or rectilinearly shaped figure. Relatively long rollers 22 and 23 are secured upon shafts 24 the opposite ends of which are journaled in bearing openings in the outer rear ends of the brackets 20. A strip or band of paper or other suitable sheet material 25 having test objects 26 thereon in the form of letters is mounted upon these rollers, the opposite ends thereof being connected to the opposite rollers in any manner or way desired. The sheet 25 extends through openings 25ª in the circular plate 15 practically opposite the rollers 22 and 23 and the opposite ends thereof are adapted to be wound up upon the rollers 22 and 23. As is obvious, the said sheet may be unwound from one roller and wound upon the other simultaneously.

For the purpose of unwinding the sheet 25 from one roller on to another, I have provided sheaves or pulleys 30 and 31 upon one end of each of the shafts 24. A rope or cord 32 operates in the grooves formed in the peripheries of these rollers or pulleys and is guided by the guide pulleys 33 and 34 rotatably mounted upon the outer ends of the angularly related arms 35 and 36 which radiate from a sleeve 37 secured to the shaft 12. The said arms and the said grooved rollers or pulleys 30 and 31 being mounted upon and secured in fixed relation to the shaft 12, it follows that when the latter is rotated the relation of the guide pulleys 33 and 34 to the grooved rollers or pulleys 30 and 31 is not altered or changed. The cord 32 also extends over a rotatable driving sheave or pulley 38 mounted upon the shaft 12, and the said sheave is adapted to be driven or rotated by means of an endless cord 40 which extends over a grooved sleeve 41 which is rigidly connected with the pulley 38. The cord 40 is guided by guide pulleys 42, 43 and 45, the latter pulley being mounted on a bracket as shown.

In order to rotate the drive pulley or sheave 38 to effect rotation of the shafts 24 and of the rollers 22 and 23 thereon, movement of the cord 40 may be effected in one direction or the other. Such movement causes rotation of the pulley or sheave 38 which operates to drive the cord 32 which, in turn, operates to cause rotation of the rollers 22 and 23. By rotation of the rollers 22 and 23, in the manner as indicated, the sheet 25 is unwound from one of the rollers 22 or 23 and simultaneously wound on to the other of said rollers. By this operation, any one of the rows of test objects which extend transversely of the sheet 25 may be brought into position in rear of the opening 4 previously referred to.

It will be observed that the endless cord 40 extends a distance in front of the apparatus. The front portion thereof should terminate at a point in convenient relation to the person who is examining a patient by the use of the apparatus so that such person may conveniently adjust the cord to operate the rollers 22 and 23 to cause the transference or adjustment of the sheet 25 from one roller to the other.

For the purpose of effecting angular adjustment of the sheet 25 about the horizontal axis of the opening 4, I have provided means whereby the shaft 12 may be rotated. The said means comprises a cord 50 which is mounted upon and guided by grooved pulleys or sheaves 51. The forward end of the said cord is provided with a weight 52. The rear portion of the said cord extends around a grooved pulley or sheave 53 which is rigidly connected with the shaft 12. The rear or opposite end of the cord 50 is provided with a weight 55 which counter-balances the weight 52 previously referred to. By adjusting the cord 50 longitudinally, rotation of the shaft 12 is effected. Such rotation causes a corresponding rotation of the plate 15 which is supported, as already indicated, in parallel relation to the rear side of the panel 2, in position to support the portion of the sheet 25 in rear of the opening 4. Angular rotation of the said plate and of the sheet 25 supported thereon which sheet bears the test objects 26 is provided in order that the eyes may be tested for astigmatism or for any other purpose requiring angular adjustment of the said test objects. The character or extent of the astigmatic condition may be ascertained by comparing the position of the sheet 25 and the test objects thereon with the degree scale 5 upon the plate 6 previously referred to. Such comparison furnishes the information necessary to enable the optician to prepare lenses for the correction of the astigmatism which may be found to be present.

Instead of employing letters 26 upon the sheet 25 as indicated in Fig. 4 of the drawings, I may employ sheets having groups of parallel lines 60 thereon as shown in Fig. 7; or groups of short dash lines 61 as shown in Fig. 8; or groups of lines extending at right angles to each other to form groups of squares as indicated at 62 in Fig. 9. It will be understood that there may be a greater or less number of these groups arranged in spaced relation to each other upon a sheet 25 and that the size or thickness of the lines 60, of the short dash lines 61 and of the lines forming the squares 62 may be varied in order to meet different conditions met with in the examination of the eyes of different persons.

For the purpose of illuminating the front surface of the sheet 25 so as to illuminate the test objects which may be displayed thereon, I have provided incandescent electric lights at 63 which are adjustably mounted at 64 upon the panel 2. These lights are located upon opposite sides of the opening 4 and may be adjusted with relation thereto so as to vary the illumination of the test objects on the sheet 25 which may be visible through said opening.

The lights 63 are adapted to be controlled by a switch 65 of any known construction.

I have also provided the apparatus with a device 70 of known construction which is adapted to be employed for testing the eye muscles of a person and also for the purpose of testing eyes to ascertain whether or not they have capacity to differentiate between the different colors. In other words, the said device 70 is adapted for making what is generally known as the muscle test and the color test in the examination of the eyes.

The said device 70 is adapted to be rotated by means of a finger piece 71 so as to bring different portions or segments thereof into registry with an opening 72 in the panel 2.

The said device 70 is located within a closed chamber 73 within which is located an electric incandescent light 74 which light occupies a position in rear of the said device 70.

It will be seen that by my invention I have provided an apparatus for testing the eyes with novel means for supporting the test object or objects and also with means whereby the said test object or objects may be adjusted with facility by a person occupying a position a considerable distance from the apparatus.

It will also be seen that by my invention, I have provided an apparatus which is simple in construction but which is efficient for the purpose for which it has been designed.

Having thus described my invention, what I claim and desire to secure by Letters Patent is:

1. In apparatus for testing eyes, the combination of an upright plate having an opening therethrough, a horizontal shaft supported in rear of said opening, at right angles to said plate, which shaft is rotatable, means upon the said plate for engaging a member carried upon the front end of said shaft for steadying the same, a rotatable sheet, means carried by said shaft for supporting said sheet, which means is adjustable for effecting rectilinear adjustment of said sheet, whereby different test objects upon said sheet may be moved into position in rear of the opening through the said plate.

2. In apparatus for testing eyes, the combination of an upright plate having an opening therethrough, a horizontal shaft supported in rear of said opening at right angles to said plate, a disc mounted on the front end of said shaft, means for causing rotation of said shaft, means carried by said plate for engaging the periphery of said disc to steady the same upon rotation thereof with the said shaft, spaced rollers mounted in rear of said disc, a sheet of flexible material supported upon said rollers, the intermediate portion of which strip extends in front of the said disc and in rear of the opening in said upright plate, and means mounted upon the said shaft for effecting rotation of the said rollers in either direction to effect adjustment of the said strip in one direction or the other.

3. In apparatus for testing eyes, the combination of an upright plate having an opening therethrough, a sheet of flexible material mounted in rear of said opening, which sheet is provided with test objects thereon, oppositely disposed means for supporting the opposite end portions of said sheet, said means being adjustable for effecting rectilinear adjustment of the said sheet and of the test objects thereon, and means for effecting angular adjustment of said sheet about a horizontal axis which is concentric with the said opening.

4. In apparatus for testing eyes, the combination of an upright plate having an opening therethrough, a sheet located in rear of said opening which sheet is provided with test objects on the front face thereof, and a rotatable support for said sheet which support is mounted in proximity to the rear side of the said plate, substantially as described.

5. In apparatus for testing eyes, the combination of an upright plate having an opening therethrough, a horizontal shaft in rear of said plate, means for supporting the same axially of the said opening, a support mounted upon the front end of said shaft in adjacent relation to the rear side of the said plate, a flexible sheet adjustably mounted on said support which sheet is provided with test objects on the front face thereof, and means for causing rotation of said shaft and the support mounted thereon to effect angular adjustment of the said sheet.

6. In apparatus for testing eyes, the combination of an upright plate having an opening therethrough, a circular plate rotatably supported directly in rear of and in adjacent relation to the said plate and concentrically with the said opening, a flexible sheet adjustably mounted on said circular plate which sheet is provided with test objects on the front face thereof which are adapted to be adjusted into position directly in rear of the said opening, and means for causing rotation of the said circular plate to vary the angular position of the said test objects.

7. In apparatus for testing eyes, the combination of an upright plate having an opening therethrough, a plate rotatably mounted in rear of and in adjacent relation to the said upright plate, the axis of rotation of the said rotatable plate being in axial alinement with the center of said opening, rollers mounted on the said rotatable plate, a flexible sheet mounted on said rollers and extending through openings through the said rotatable plate and across the front face of the said plate in front of the said opening which sheet is provided with test objects on the front face thereof, means for rotating said rollers to effect rectilinear adjustment of the said test objects, and means for causing rotation of the said rotatable plate, substantially as described.

8. In apparatus for testing eyes, the combination of an upright plate having an opening therethrough, a shaft supported in rear of said plate in axial alinement with said opening, a sheet of flexible material which sheet is provided upon its front face with test objects, means upon the front end of said shaft for suporting said flexible sheet, means for effecting lengthwise adjustment of the said sheet to effect rectilinear adjustment of the said test objects, and means for causing rotation of the said shaft and of the sheet supporting means on the front end thereof whereby angular adjustment of the said sheet and of the test objects thereon may be effected.

9. In apparatus for testing eyes, the combination of an upright plate having an opening therethrough, said plate being provided with a degree scale which encircles the said opening, a rotatable disc supported directly in rear of and in adjacent relation to the said upright plate, the axis of rotation of said disc being coincident with the axis of said opening, means upon the said upright plate in engagement with the periphery of the said disc, rollers supported upon the said disc at the rear side thereof, a sheet of flexible material mounted at its opposite ends upon said rollers, the intermediate portion of said sheet extending through openings through the said disc and across the front face thereof, the said sheet bearing upon its front face test objects, means for causing rotation of said rollers to effect adjustment of said sheet in one direction or the other, and means for causing rotation of the said disc for varying the angular relation of the said sheet and the test objects thereon to the opening through the said upright plate.

10. In apparatus for testing eyes, the combination of an upright plate having an opening therethrough, a shaft horizontally mounted in axial relation to said opening, the said shaft being located in rear of said plate, a plate mounted upon the front end of said shaft in adjacent relation to the rear side of the said upright plate which plate is provided with spaced openings located upon opposite sides of the center thereof, arms extending rearwardly from the said second named plate, rollers mounted on said arms, a sheet of flexible material which sheet is provided with test objects on the front face thereof mounted at its opposite ends upon said rollers and extending through the said openings and across the front face of the said second named plate, means mounted upon the said shaft for effecting rotation of said rollers in either direction to cause lengthwise adjustment of the said sheet with the test objects thereon, means located at a distance from the said shaft for operating the last mentioned means, and means also located at a distance from said shaft for effecting rotation of the latter to cause angular adjustment of the said flexible sheet and the test objects thereon with relation to the opening through the said upright plate.

In testimony that I claim the foregoing as my invention I have hereunto signed my name this 12 day of Sept., A. D., 1924.

JOSEPH HAGERTY.